US005671356A

United States Patent [19]

Wang

[11] Patent Number: 5,671,356
[45] Date of Patent: Sep. 23, 1997

[54] METHOD AND APPARATUS FOR MICROCODE LOADING IN A MULTI-NODAL NETWORK EXHIBITING DISTRIBUTED CONTROL

[75] Inventor: David T. Wang, San Jose, Calif.

[73] Assignee: International Business Machines Corporation, Armonk, N.Y.

[21] Appl. No.: 660,840

[22] Filed: Jun. 10, 1996

Related U.S. Application Data

[63] Continuation of Ser. No. 241,975, May 11, 1994, abandoned.

[51] Int. Cl.$^6$ ................................................. G06F 15/00
[52] U.S. Cl. ................................. 395/200.03; 395/474
[58] Field of Search ........................ 395/200.01, 200.12, 395/600, 700, 800, 200.03, 200.08

[56] References Cited

U.S. PATENT DOCUMENTS

| | | | |
|---|---|---|---|
| 4,335,426 | 6/1982 | Maxwell et al. | 395/200.1 |
| 4,491,914 | 1/1985 | Sujaku | 395/700 |
| 4,663,707 | 5/1987 | Dawson | 395/700 |
| 4,752,870 | 6/1988 | Matsumura | 395/700 |
| 4,785,397 | 11/1988 | Koizumi et al. | 395/650 |
| 4,888,683 | 12/1989 | Koizumi et al. | 395/650 |
| 4,896,289 | 1/1990 | Svinicki et al. | 395/183.1 |
| 4,914,571 | 4/1990 | Barazt et al. | 395/600 |
| 4,953,162 | 8/1990 | Lyons et al. | 370/94.1 |
| 5,136,718 | 8/1992 | Haytt | 395/800 |
| 5,142,680 | 8/1992 | Ottman et al. | 395/700 |
| 5,155,833 | 10/1992 | Cullison et al. | 395/700 |
| 5,222,242 | 6/1993 | Choi et al. | 395/800 |
| 5,230,052 | 7/1993 | Dayan et al. | 395/700 |
| 5,230,065 | 7/1993 | Curley et al. | 395/200.08 |
| 5,247,659 | 9/1993 | Curran et al. | 395/700 |
| 5,280,627 | 1/1994 | Flaherty et al. | 395/700 |
| 5,317,735 | 5/1994 | Schombery | 395/650 |
| 5,349,664 | 9/1994 | Iketa et al. | 395/700 |
| 5,349,673 | 9/1994 | Yasuda | 395/700 |
| 5,367,688 | 11/1994 | Croll | 395/700 |
| 5,390,297 | 2/1995 | Barber et al. | 395/700 |
| 5,404,565 | 4/1995 | Gould et al. | 395/800 |
| 5,410,651 | 4/1995 | Sekizawa et al. | 395/200 |
| 5,432,909 | 7/1995 | Cok | 395/200 |
| 5,511,208 | 4/1996 | Boyles et al. | 395/800 |

FOREIGN PATENT DOCUMENTS

| | | |
|---|---|---|
| 0358292A2 | 3/1990 | European Pat. Off. |
| 0479427A2 | 4/1992 | European Pat. Off. |

OTHER PUBLICATIONS

IBM Technical Disclosure Bulletin, vol. 31, No. 12, May 1989 (pp. 246–247), 'Initial Program Load on a Peer Ring'.

*Primary Examiner*—Ayaz R. Sheikh
*Attorney, Agent, or Firm*—Ohlandt, Greeley, Ruggiero & Perle

[57] ABSTRACT

A distributed data processing system includes plural, processor-containing nodes that are interconnected in a network. Each node has plural neighbor nodes, with neighbor nodes being connected via a direct link. One node includes a copy of functional microcode in addition to base microcode. Each node further includes memory for storing base microcode which enables, on power-up, for a processor in the node to manifest partial operational capability, including program load functions and a communications capability with neighbor nodes. The node's processor, in combination with the base microcode, determines if the node's memory stores a copy of functional microcode and if yes, causes the functional microcode to be loaded. If it is determined that functional microcode is not present in the nodes memory, the node issues a request to neighbor nodes to download functional code, irrespective of whether the neighbor node's are known to include the functional microcode or not. After a time out, the request to download is repeated. Within the network, the node which stores the functional microcode will download that code to its neighbor nodes which, in turn, will download the functional code to their neighbor nodes, etc. thereby enabling, eventually, all nodes in the network to acquire the functional microcode.

5 Claims, 2 Drawing Sheets

METHOD AND APPARATUS FOR MICROCODE LOADING IN A MULTI-NODAL NETWORK EXHIBITING DISTRIBUTED CONTROL

This is a continuation of application Ser. No. 08/241,975 filed on May 11, 1994, now abandoned.

FIELD OF THE INVENTION

This invention relates to a method and apparatus for control of microcode loading in nodes included in a multi-nodal network and, more particularly, to a microcode loading procedure which employs a single copy of microcode to render the network completely functional.

BACKGROUND OF THE INVENTION

An initial program load (IPL) occurs in a processor when power is first applied or when a processor reset function is enabled. IPL accomplishes a loading of both base and functional microcode to enable full scale operation of the processor. Base microcode (also called bootstrap code) is generally stored in the processor in nonvolatile form so as not to be lost when power is turned off. Upon a power-up, base microcode is loaded automatically and enables a further loading of a functional microcode which allows for full operation of the processor. Base microcode typically includes data for configuring the processor, enables input/output node communication, performs diagnostic routines and includes code which enables loading of operating system software. In U.S. Pat. No. 4,663,707 to Dawson, a computer system is described which includes multiple levels of base microcode. Microcode levels, other than the primary level, are contained in non-volatile memory that is writable so as to enable modification of base microcode.

Functional microcode generally occupies a much larger memory space than base microcode, is often stored on disk and is loaded into the processor after the base microcode has been loaded. In systems which comprise multiple processors, the prior art has suggested that only one processor include functional microcode and pass it to associated processors. In U.S. Pat. No. 4,785,397 to Koizumi et al., program loading occurs in one computer connected to a network, and, after assuring that it has been properly loaded, the program is passed on to other processors connected to the network.

In U.S. Pat. No. 5,155,833 to Cullison et al., a master-slave microprocessor arrangement is shown. The slave processor includes a random access memory that serves at initialization time as the slave processor's base microcode memory. A master processor writes the slave processor's base memory into its memory array when the memory is to serve as the "boot" memory, following system reset. In U.S. Pat. No. 5,230,065 to Curley et al., a plurality of central processing units have access to all system resources, however, during initialization, system resources are allocated to the central processing units according to a preselected distribution procedure.

U.S. Pat. No. 4,896,289, to Svinicki et al. and U.S. Pat. No. 4,491,914 to Sujaku both consider initial program load functions with Svinicki et al suggesting pre-loading of microcode to enable initialization without the need for storing a full initialization program in non-volatile memory. Sujaku teaches that when an initial program load device on a processor has malfunctioned, initial program load is handled by one or more parallel processors so as to enable a rapid initialization operation.

The prior art further considers various methods for downloading of both base and functional microcode and operating systems between computers connected to a network. Ottman et al. (U.S. Pat. No. 5,142,680) enables files comprising an operating system to be downloaded from one computer on a network to another computer on the network. U.S. Pat. No. 5,230,052 to Dayan et al. describes a system connected to a local area network wherein one processor can access microcode from nonvolatile storage in a processor that is remotely positioned in the network. U.S. Pat. No. 4,335,426 to Maxwell et al., also describes a procedure for enabling initial program load data to be transferred between processors connected to a network. Maxwell et al. indicate that each processor is assigned as either a source station or an acceptor station. These states are manually set and can be changed only manually. Initial program load data is transferred from a source processor to an acceptor processor and thereby enables the acceptor processor to avoid the need for storing initial program load data.

U.S. Pat. No. 4,752,870 to Matsumura describes a decentralized computer system which includes a system controller and a plurality of workstations. Initial program loading is accomplished by transferring the program from one of the work stations to the system controller, or to another work station that has issued a request for initial program load. While Matsumura's system is decentralized, a system controller controls flow of data within the system and between work stations connected to the system controller. Thus, while processing within the system is decentralized, system control and data transfers are centrally administered.

Many distributed processing networks now employ multiple nodes that are interconnected in a network that includes no central controlling node. Network management and control is distributed amongst the nodes and bottlenecks are avoided which occur when system control is connected with a single functional element. In such a system, initial program load can occur if each node contains a copy of both base and functional microcode. Such an arrangement requires that each node have nonvolatile memory which stores a copy of both the base and functional microcode-thereby creating a significant duplication of code storage throughout the network. Nevertheless, upon power-up, each node in the network is enabled to become fully functional in minimal time.

Accordingly, it is an object of this invention to provide a multi-nodal network wherein memory assets allocated to functional microcode are minimized.

It is a further object of this invention to provide a multi-nodal network with a functional microcode load procedure that is distributed and does not rely upon centralized control.

It is still another object of this invention to provide a multi-nodal network with an initial program load capability that avoids the need for multiple duplicate copies of functional microcode stored in non-volatile memory throughout the network.

SUMMARY OF THE INVENTION

A distributed data processing system includes plural, processor-containing nodes that are interconnected in a network. Each node has plural neighbor nodes, with neighbor nodes being connected via a direct link. One node includes a copy of functional microcode in addition to base microcode. Each node further includes memory for storing base microcode which enables, on power-up, for a processor in the node to manifest partial operational capability, including program load functions and a communications capability with neighbor nodes. The node's processor, in combination with the base microcode, determines if the node's memory stores a copy of functional microcode and if yes, causes the functional microcode to be loaded. If it is determined that functional microcode is not present in the nodes memory, the node issues a request to neighbor nodes to download functional code, irrespective of whether the neighbor nodes are known to include the functional microcode or not. After a time out, the request to download is repeated. Within the network, the node which stores the functional microcode will download that code to its neighbor nodes which, in turn, will download the functional code to their neighbor nodes, etc. thereby enabling, eventually, all nodes in the network to acquire the functional microcode.

DETAILED DESCRIPTION OF THE INVENTION

Figure 1:
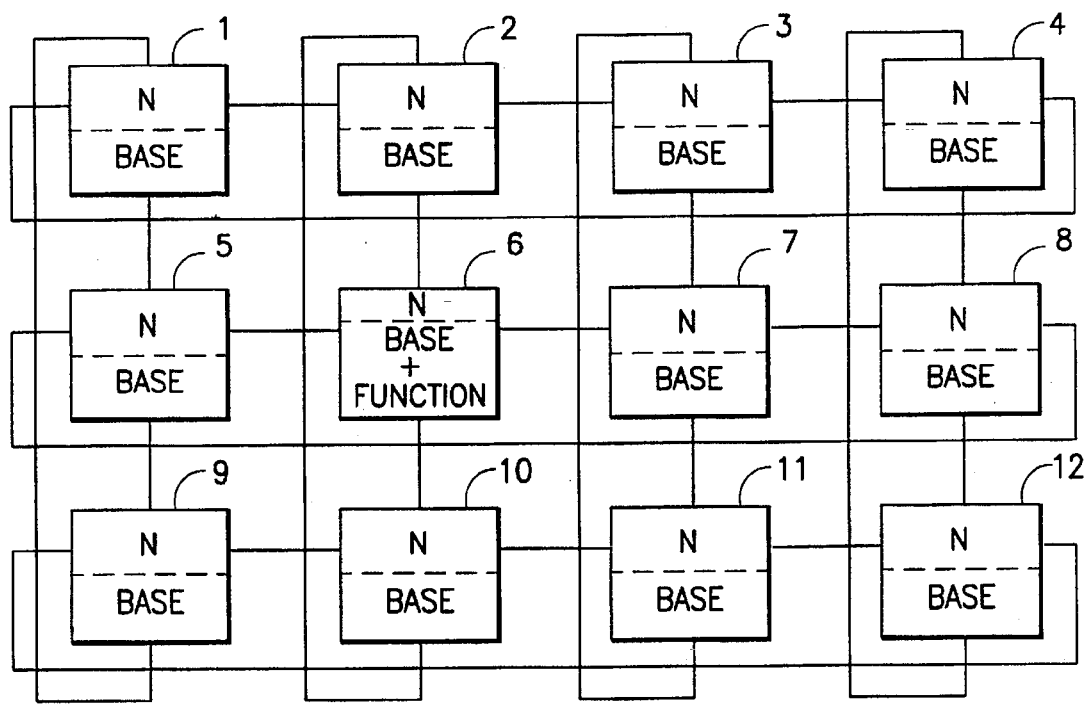
FIG. 1 is a high level block diagram illustrating a multi-node network.

In FIG. 1, a multi-nodal, distributed data processing network is shown comprising nodes 1–12. Interconnection lines between nodes create a torus-like structure that enables any one node to communicate with any other node. Each of nodes 1–12 includes a processor and non-volatile memory which stores base microcode. As indicated above, base microcode enables a processor in a node to become partially functional so as to enable the node to handle input/output functions, self test functions, and other rudimentary processing actions. Only one node (node 6) includes functional microcode stored in its nonvolatile memory. To prevent loss of the functional microcode in the event of failure of node 6, functional microcode may be duplicated elsewhere in the network (not shown).

Each of nodes 1–12 is independently operable and includes in its operating software, functional capability to implement distributed control of the network and its included processors. More specifically, no one node exerts overall control of the network. Each of nodes 1–12 operates independently and is controlled by code internal to each to operate upon parameters that are supplied from other nodes.

Figure 2:
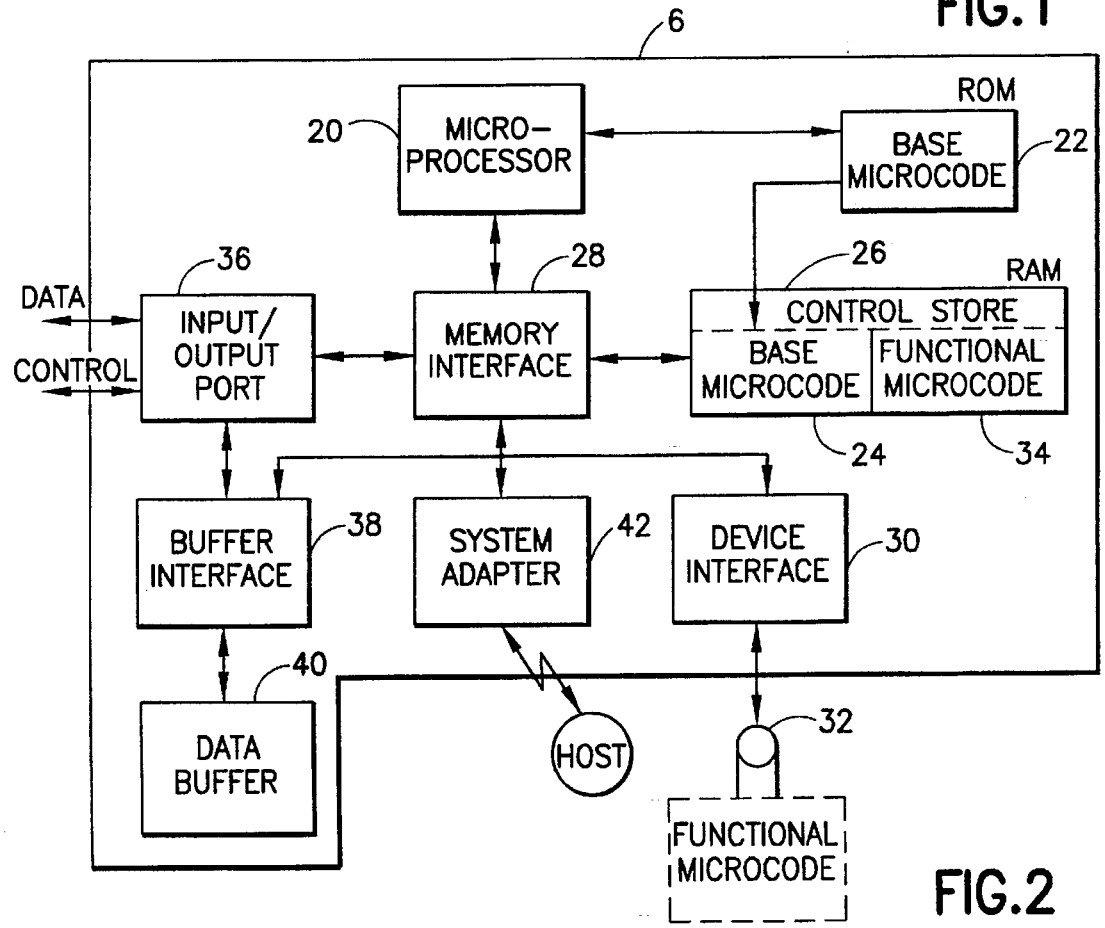
FIG. 2 is a high level block diagram of a node in the network of FIG. 1, which includes both base microcode and functional microcode.

In FIG. 2 a block diagram of node 6 is shown, including modules needed to enable performance of data processing functions. A microprocessor 20 controls the overall operation of node 6 and, upon power-up, causes base microcode to be read from read only memory (ROM) 22 into a base microcode storage area 24 within random access memory (RAM) control store 26. Upon the base microcode being placed in control store 26, microprocessor 20 is enabled to commence operations of a limited nature. Those operations include controlling memory interface 28 to cause device interface 30 to access functional microcode stored on disk drive 32. That action causes the functional microcode on disk drive 32 to be written into control store area 34. At this stage, microprocessor 20 in combination with both the base and functional microcodes is capable of performing all data processing functions assigned to node 6. As above indicated, the base microcode enables microprocessor 20 to execute, via memory interface 28, message transfers through input/output port 36. Functional microcode enables microprocessor 20 to receive full data transfers from other nodes which input/output module 36 feeds, via a buffer interface 38, to data buffer 40. Node 6 is adapted to communicate, as are other nodes, with host processors that are external to the network of FIG. 1. Such communications occur through system adapter 42.

Figure 3:
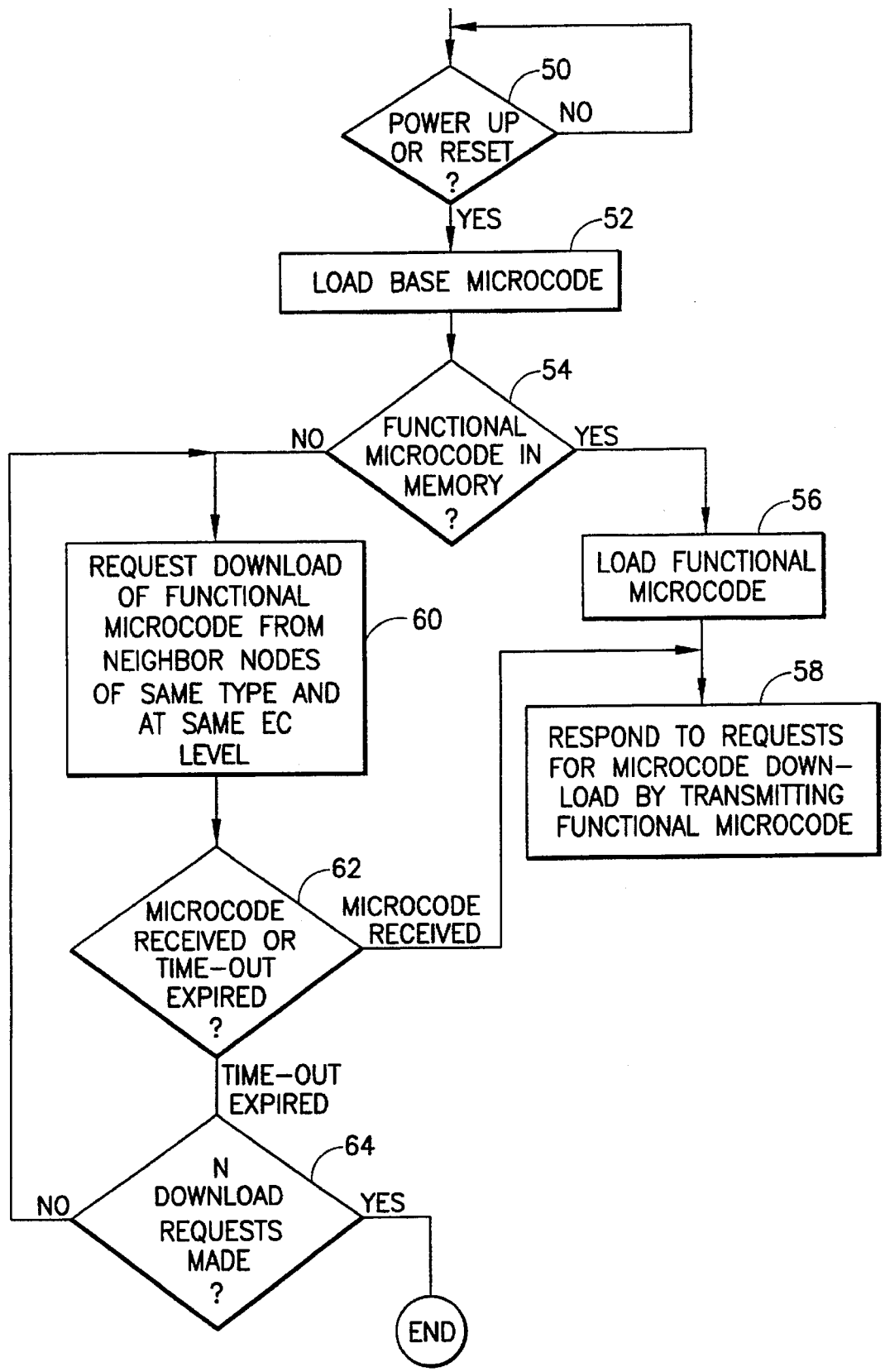
FIG. 3 is a high level flow diagram illustrating the procedure of the invention.

Turning now to FIG. 3, the procedure employed by each of nodes 1–12 in FIG. 1 to accomplish an initial program load will be described. As shown by decision box 50, until a power-up or a reset occurs no actions are required. Upon a power-up or reset, each of nodes 1–12 loads its base microcode into control store 26 in parallel (box 52). Upon the base microcode being loaded, microprocessor 20 in each node inquires as to whether functional microcode is present in its resident non-volatile memory (decision box 54). If yes, the functional microcode is loaded into control store 26 (box 56). This action occurs in node 6, as functional microcode is resident on disk drive 32. Thus, node 6 becomes fully operational before all other nodes in the network of FIG. 1. At this stage node 6 is adapted to respond to requests for a microcode download by transmitting copies of the microcode (box 58).

If, as in the case of nodes 1–5 and 7–12, no functional microcode is found in local nonvolatile memory (decision box 54), each node, substantially concurrently, requests a download of functional microcode from its neighbor nodes. Thus, for instance, node 8 requests downloads of functional microcode from nodes 4, 7 and 12. Node 7, in turn, requests downloads of functional microcode from nodes 3, 8, 11 and 6. Preliminary to requesting the download, each node inquires whether its neighbor node(s) are of the same type and engineering change level. If not, no request is issued to the non-matching node. In FIG. 1, it is assumed that all nodes are of the same type and at the same engineering change level. Thus, all nodes concurrently issue requests for download of functional microcode.

As shown in FIG. 3, each node enters into a wait state until the requested functional microcode is received or until a time-out occurs (decision box 62). If a time-out occurs without the requested microcode having been received, the requesting node determines whether it has transmitted N requests. If not, the procedure recycles to box 60 and another set of requests for download are issued. Only when N requests have been made, does the procedure end, having failed to achieve the required microcode download. When the microcode is received, the requesting node is then able to respond to requests from other nodes to download microcode.

Returning to FIG. 1, when node 8 issues its initial requests for a download of microcode, nodes 4, 7 and 12 do not respond immediately. However, node 7, simultaneously, issues requests for microcode download to nodes 3, 8 11 and 6. Node 6 responds to node 7 with a download of the functional microcode, thereby enabling node 7 to respond to requests that have been received from nodes 3, 8 and 11. Each of the latter three nodes is then able to respond to their neighbor nodes who have requested a functional microcode download. In this manner, all nodes within the network rapidly acquire copies of the functional microcode and the entire network becomes operational.

Through use of this invention, only one node (and possibly one or more duplicate nodes) are required to maintain non-volatile storage capacity for functional microcode. If all of the remaining nodes have identical memory characteristics as the node storing the functional microcode, the other nodes may employ their unused non-volatile storage area for other code storage purposes.

It should be understood that the foregoing description is only illustrative of the invention. Various alternatives and modifications can be devised by those skilled in the art without departing from the invention. For instance, while the invention has been described in the context of all nodes being reset or powered-up at the same time, the invention is also applicable when any one node is either reset or powered-up, irrespective of whether all nodes are functioning. The invention is further applicable when a new node is added to the system. Accordingly, the present invention is intended to embrace all such alternatives, modifications and variances which fall within the scope of the appended claims.

I claim:

1. A distributed data processing system including plural, processor-containing nodes interconnected in a network, each node having plural neighbor nodes, a node connected to a neighbor node via a direct link, certain of said nodes coupled to other nodes via intermediate nodes, at least one node of said plural nodes including a copy of functional microcode that enables said one node to fully accomplish assigned data processing tasks, each said node further comprising:

memory for storing base microcode which enables, on power-up, a processor in said node to manifest partial operational capability, said capability including at least a program load function and a communication capability with neighbor nodes;

first means in said processor, operating in combination with said base microcode, for determining if said memory also stores a copy of said functional microcode, and if yes, executing said functional microcode, said first means in said processor further responsive to a determination that said functional microcode is not present in said memory, to issue a request to download said functional microcode to all neighbor nodes connected by a direct link and to repeat issuing said request to download to only said neighbor nodes connected by a direct link, and not to any node connected thereto via an intermediate node, until a neighbor node responds by downloading said functional microcode or until a further control function causes a cessation of said issuing of said request; and second means in said processor responsive to a request from a neighbor node connected by a direct link, for downloading said functional microcode if a copy of said microcode is present in said node and to otherwise be non-responsive upon receipt of said request, and to be responsive to a subsequent said request only if said functional microcode exists in memory of the node.

2. The distributed data processing system as recited in claim 1, wherein said node, in issuing a request to a connected neighbor node to download functional microcode, first determines if said neighbor node is of a same type and is configured to a same engineering change level, and if yes, issues said request to download to said neighbor node.

3. A distributed data processing system comprising:

plural nodes, each node containing a data processor;

data link means interconnecting neighboring nodes so as to enable communications therebetween, certain said plural nodes coupled via plural data link means through an intermediate node or nodes;

non-volatile storage means in each node for storing a copy of base microcode, said base microcode enabling a data processor in a node to manifest partial operational capabilities, including program loading functions and a communication function with neighbor nodes;

memory means in at least one node, but less than all said plural nodes, for storing functional microcode that enables said at least one node to fully accomplish assigned data processing tasks; and load means in each of said plural nodes in combination with the data processor and base microcode residing in each said node, for determining if a copy of said functional microcode resides in said node and, if not, said load means issuing a request only to neighbor nodes connected by one data link, and not to any node interconnected thereto via an intermediate node, to download said functional microcode, and to continue issuing said request to download said functional microcode until one of said neighbor nodes responds by downloading said functional microcode or until a further control function is enabled, said load means further responsive to a request from a neighbor node connected by a direct link to download said functional microcode if a copy of said microcode is present in said node and to otherwise be non-responsive upon receipt of said request, and to be responsive to a subsequent said request only if said functional microcode exists in memory of the node.

4. The distributed data processing system recited in claim 3 wherein each said node issues said request to download only to nodes evidencing a same type and configured to a same engineering change level.

5. A method for initial program load in nodes of a distributed data processing system, each node having plural neighbor nodes, a node connected to a neighbor node via a direct link, certain of said nodes coupled to other nodes via intermediate nodes, each node performing a method comprising the steps of:

responding to a power-up signal to load base microcode from resident read only memory in said node;

determining whether functional microcode is present in non-volatile memory in said node and, if yes, loading said functional microcode into random access memory to prepare said node for full data processing action, and if no, issuing a request to neighbor nodes connected by a direct link for a download of said functional microcode;

reissuing said request to download said functional microcode only to neighbor nodes connected by a direct link if no download of functional microcode is received within a predetermined time period; and responding to a request from a neighbor node connected by a direct link to download said functional microcode if a copy of said microcode is present in said node and to otherwise be non-responsive upon receipt of said request, and to be responsive to a subsequent said request only if said functional microcode exists in memory of the node.

\* \* \* \* \*